United States Patent Office 2,863,809
Patented Dec. 9, 1958

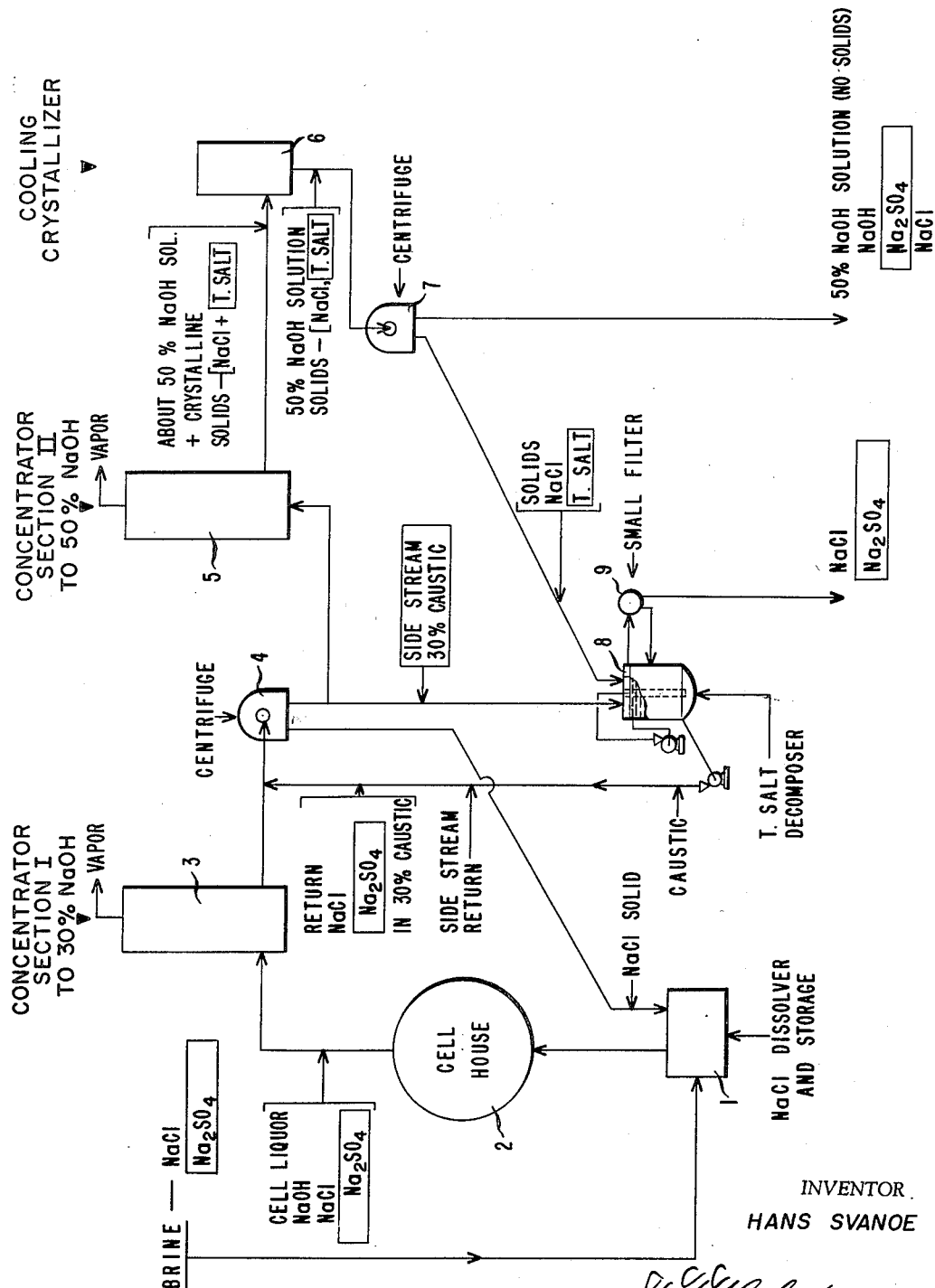

2,863,809

PROCESS FOR CONCENTRATION OF CAUSTIC CELL LIQUOR

Hans Svanoe, Warren, Pa., assignor to Struthers Wells Corporation, Warren, Pa., a corporation of Maryland Application April 5, 1956, Serial No. 576,314

4 Claims. (Cl. 204—98)

This invention relates to a process for the concentration and purification of dilute brine-containing solutions and relates more particularly to a process for the concentration and purification of brine from sodium chloride brine which has been subjected to electrolysis. This application is a continuation-in-part of my copending application S. N. 266,641, filed January 16, 1952, now abandoned.

The bulk of sodium hydroxide and practically all of the chlorine marketed today is produced by electrolyzing sodium chloride brine. In such processes the diaphragm cell is the most commonly used. The cell liquor leaving the diaphragm cells usually contains, inter alia, about 10–12% caustic and 10–15% sodium chloride in solution. It is customary to concentrate this cell liquor, as well as liquors from Krebs, Hargraves-Bird and other cells, to 40–50% caustic, producing a liquor that at room temperature and before further purification contains about 1% sodium chloride.

Most sodium chloride brines contain a certain quantity of sodium sulfate which is present in the purified brine. This sodium sulfate averages, in pure brine, close to 1.5% calculated on the original content of sodium chloride in the brine or a sodium chloride-sodium sulfate ratio of about 70 to 1. In the electrolysis of such brines the sodium sulfate must be purged from the system in order to prevent it from crystallizing out as a solid and from contaminating the final product. Moreover, it is important to keep the sodium sulfate content in the brine to the electrolytic cells at a low value, thereby increasing the life of the carbon electrodes employed in the electrolytic cells and providing other operating advantages.

During concentration of caustic cell liquor, salt is crystallized out during evaporation. This salt is usually dissolved and returned to the electrolytic cells as brine, the sodium sulfate being concentrated and removed with the crystalline sodium chloride as solids during an evaporation process. The usual procedure is to cool the brine obtained by re-dissolving salt contaminated with sodium sulfate to a sufficiently low temperature and crystallizing out excess sodium sulfate as Glauber salt, thereby attempting to avoid its accumulation in the caustic concentrating system. The processes heretofor employed, however, attempt to operate the brine concentration by continuous means with recycle of so-called chiller salt recovered from the concentration of the caustic to 50% or above. In this recycle sodium sulfate is returned to the system and to the electrolytic cells. Such operation requires frequent purging of the recovery system to prevent undesirable build-up of the sodium sulfate. The process of the invention avoids sodium sulfate build-up in brine recovery systems.

An object of the present invention is to provide an economical process for the treatment of sodium chloride brine. Another object is to provide a process for the concentration and purification of sodium chloride brine that has been subjected to electrolysis. Yet another object is to provide a method of removing sodium sulfate from sodium chloride brine. A further object is to provide a caustic cell liquor concentration system, for treatment of electrolytic cell liquors, wherein sodium chloride is recovered from a partially concentrated caustic and returned to the electrolytic cell substantially free from sodium sulfate. Still another object is to effect the separation of the sodium sulfate by suspension from the sodium chloride. Other objects and advantages will hereinafter appear.

In accord with the invention the above objects are accomplished as will become more fully understood by reference to the drawing which illustrates diagrammatically a preferred manner of conducting the process of the invention.

The single drawing is the flow sheet of a preferred manner of conducting the process of the invention. Brine to be subjected to the electrolysis is usually mixed with recycled sodium chloride. The mixing may be done in a dissolver storage vessel 1, the resulting solution is returned to the cell house 2 wherein the sodium chloride is electrolysed, chlorine being separated at one pole and sodium at the other. The chlorine is recovered as a gas and the sodium forms caustic with the water present. The caustic in solution passes from the cell house 2 as a cell liquor containing unelectrolysed sodium chloride and some sodium sulfate, which is invariably contained in the brine feed. The cell liquor is passed to the first concentrator 3, which is preferably an evaporator-crystallizer, in which the concentration of the cell liquor is increased to an amount that will crystallize out sodium chloride but below the concentration at which triple salt (T. salt) crystals are produced. The latter crystals start to form in a cell liquor effluent at a concentration of about 35% caustic by weight. Operations in the section I concentrator therefore is carried out to give a caustic content in the liquor up to about 30% by weight, but little if any higher.

When concentrated to the above extent there will be practically no crystallization of sodium sulfate with the sodium chloride crystals formed. The slurry of salts and caustic liquor is passed to the centrifuge 4 in which the crystals present in the caustic liquor are separated and the crystal-free liquor sent to the second concentrator 5. This concentrator like the first, is preferably an evaporator crystallizer similar to concentrator 3. In concentrator 5 the about 30% caustic from centrifuge 3 is concentrated to 45% to 55%. At such concentrations sodium chloride and a triple salt of NaOH—NaCl—Na$_2$SO$_4$ will crystallize out in concentrated caustic. The slurry from this concentrator 5 is transferred to the cooling crystallizer 6, wherein the temperature of the slurry is dropped to about ambient temperatures or below, for more complete crystallizations of the salts present.

The slurry of salts in concentrated caustic from crystallizer 6 is contrifuged for the separation of the salt crystals in centrifuge 7. The concentrated caustic is discharged to storage with a small amount of sodium sulfate in solution. The salts separated in the centrifuge 7 are transported to the T. salt decomposer 8. An efficient process requires that the caustic values in the triple salt as well as the sodium chloride contained therein be recovered.

Recovery of the aforesaid values from the solids is accomplished by treatment in the T. salt decomposer 8. The treatment in this vessel involves washing the solids with caustic liquor from centrifuge 4, a liquor that contains no more than about 30% caustic, and by fluid suspension of the solids in such a caustic, separating the sodium sulfate crystals from the system, filtering them from the recirculated suspension withdrawn from the decomposer 8 on a fine filter 9.

The washing liquor from decomposer 8 increased somewhat in caustic content is returned to the feed to centrifuge 4. From the latter centrifuge the sodium chloride crystals, substantially sodium sulfate-free are returned to the dissolver 1.

The advantages derived from operating in accord with the process as above described are many fold. First, there is no build up of sodium sulfate in the liquor sent to the cell house. The only sodium sulfate entering the system comes in with the raw brine. No sodium sulfate is added in the recycled and recovered brine. Quite to the contrary, only sodium chloride crystals that are free from sodium sulfate are returned to the dissolver 1. This is accomplished by operating the first concentrator 3 at a concentration of below 35% and preferably at about 30% of caustic. At this concentration the sodium sulfate is maintained in solution when present in amounts met with in caustic cell liquor concentrations. The cell liquor to the concentrator 3 may have for example and in solution in water 1000 parts of NaOH, 1790 parts of NaCl and a maximum of about 30 parts of $Na_2SO_4$. This liquor can be concentrated from cell liquor concentrations to 30% caustic concentration, without crystallization of the sodium sulfate. The sodium chloride that does crystallize out of the 30% caustic can therefore be separated in the centrifuge 4 and returned to the dissolver 1 sodium sulfate-free.

Another advantage lies in the method of recovering from the T. salt the caustic values as well as a portion of the sodium chloride content of that salt. Moreover, in accomplishing this, none of the sodium sulfate content of the T. salt is returned to the system and to the cell liquor. As applicant has stated, he accomplishes a part of the separation by fluidization of the T. salt in the 30% caustic solution. Separation by fluidization is possible, applicant has found because of the difference in crystal sizes of the T. salt and the sodium chloride formed in the 45% to 55% caustic solutions. The crystal form of the T. salt is cylindrical and relatively small under the operating conditions of the present process. The crystals of sodium chloride are considerably larger and more cubical in appearance. These differences make it possible to so regulate the flow of the caustic in decomposer to give excellent separation because of the different degrees of buoyancy of the crystals.

A specific embodiment of the invention involves operating the process as illustrated in the single drawing by the use of a brine feed containing in the order of 26% NaCl. For every 1000 pounds of NaOH produced, there is required about 1530 pounds of NaCl (not including minor losses). The $Na_2SO_4$ in the brine is produced, in practice, by reacting dissolved calcium sulfate with sodium carbonate. In going through the cell house, part of the NaCl is converted to NaOH and this liquor is then passed to the first concentration step of the process. In one process, and in parts by weight, an aqueous solution containing 1000 NaOH, 1790 NaCl and a maximum of 30 $Na_2SO_4$ is fed as the cell liquor into concentrator 3. The 30% caustic liquor from this concentration will contain about 1720 NaCl including NaCl returned from decomposer 8 which is separated from the caustic liquor and sent to the dissolver 1. From the concentrator of section 11 a 50% NaOH solution carrying 170 NaCl and 40 T. salt as crystal solids goes to the cooler 6. In the cooler the solids increase to 200 NaCl and 42 T. salt. In centrifuge 7 the 50% caustic solids-free is sent to storage, this caustic contains 0.02% or less $Na_2SO_4$ and about 2% dissolved NaCl. The solids from centrifuge 7 are thereafter treated in the T. salt decomposer. The small filter removes in the order of 50 NaCl and 25.3 $Na_2SO_4$. The 30% caustic decomposing solution increases about 2% in caustic content, picks up 150 NaCl and a small amount of $Na_2SO_4$ and is returned to the centrifuge.

The process of the invention while principally adapted to the recovery of NaCl from cell liquor may also be employed for the recovery of NaCl from other caustic liquors containing $Na_2SO_4$. The essentially two cycle process, with the recovery of NaCl substantially $Na_2SO_4$ free in the first cycle and the recovery of the caustic values and NaCl in the second cycle provides a versatile process adaptable to other uses than in the treatment of cell liquors, as will be appreciated by those skilled in this art.

I claim:

1. In a process in which cell liquor from the electrolysis of brine is concentrated for the recovery of caustic and unelectrolyzed sodium chloride, the steps which comprise in a NaCl crystallization step concentrating cell liquor to a concentration at which NaCl crystals are formed and below a concentration at which the triple salt crystals sodium hydroxide-sodium chloride-sodium sulfate are produced, separating the NaCl crystals from the caustic liquor, returning the crystals to the electrolysis, further concentrating the caustic liquor to crystallize triple salt and additional NaCl, separating the mixture of crystals and treating the mixture of crystals in a suspension with the caustic solution of the NaCl crystallization step for the recovery of caustic and NaCl crystals.

2. In a process which cell liquor from the electrolysis of brine is concentrated for the recovery of caustic and unelectrolyzed sodium chloride, the steps which comprise concentrating cell liquor to a caustic concentration of about 30% by weight, separating the sodium chloride crystals from the thus concentrated liquor, dissolving the crystals and returning the resulting solution to the electrolysis, further concentrating the 30% caustic, to about 50% caustic, cooling the resulting concentrated liquor to ambient temperature, separating from the resulting slurry the crystallized triple salt and sodium chloride, treating said mixture of salts, sodium hydroxide-sodium chloride-sodium sulfate in a suspension thereof in 30% aqueous caustic, selectively separating from the suspension the sodium sulfate and returning the caustic solution to the first sodium chloride separation step.

3. In a process for treating cell liquor containing sodium hydroxide, sodium chloride and sodium sulfate in which the liquor is concentrated and caustic soda and sodium chloride are recovered the steps which comprise concentrating the cell liquor to a concentration at which sodium chloride crystals form and at which triple salt crystals, sodium hydroxide-sodium chloride-sodium sulfate are not formed, and separating from the concentrated liquor sodium chloride from its mother liquor, concentrating the mother liquor of the separation to between 45 and 55% caustic soda in said concentrate by weight, separating by filtration the sodium chloride and triple salt formed during this concentration, and removing sodium sulfate from this crystalline mixture by decomposing the triple salt in a caustic solution of a concentration at which the triple salt is unstable.

4. In a process for the separation of sodium chloride and sodium sulfate from caustic cell liquor brine the steps which comprise concentrating caustic cell liquor brine to about 30% to 35% NaOH by weight, removing the crystalline sodium chloride produced by filtration, concentrating further the filtered liquor to about 55% NaOH by weight whereby the solid phases will contain the crystalline salts, sodium chloride and the triple salt, sodium hydroxide-sodium chloride-sodium sulfate, separating the salts by filtration, decomposing the triple salt by suspending the salts in a sodium hydroxide solution of less than 35% NaOH, and separating by the difference in buoyancy the sodium chloride from the sodium sulfate crystals of said decomposition.

References Cited in the file of this patent

UNITED STATES PATENTS

| | | |
|---|---|---|
| 1,733,879 | Hooker et al. | Oct. 29, 1929 |
| 1,944,630 | Bender | Jan. 23, 1934 |
| 1,998,471 | Van der Cook et al. | Apr. 23, 1935 |
| 2,196,596 | Muskat | Apr. 9, 1940 |